(12) United States Patent
Yamauchi et al.

(10) Patent No.: US 8,136,472 B2
(45) Date of Patent: Mar. 20, 2012

(54) INDICATOR FOR PRESSURE CONTAINER

(75) Inventors: Junji Yamauchi, Toyota (JP); Yasuhito Hanaki, Toyota (JP); Kuniharu Iwamoto, Toyota (JP); Toshiaki Matsuno, Shizuoka (JP); Masahiko Okumura, Yaizu (JP); Henry J. Kelm, Lichfield, OH (US)

(73) Assignees: Toyota Jidosha Kabushiki Kaisha, Toyota-shi (JP); Oishi Machine, Inc., Shizuoka-shi (JP); Hyson Products, Brecksville, OH (US)

( * ) Notice: Subject to any disclaimer, the term of this patent is extended or adjusted under 35 U.S.C. 154(b) by 210 days.

(21) Appl. No.: 12/770,108

(22) Filed: Apr. 29, 2010

(65) Prior Publication Data

US 2010/0269748 A1 Oct. 28, 2010

Related U.S. Application Data

(63) Continuation-in-part of application No. 11/896,233, filed on Aug. 30, 2007, now abandoned.

(51) Int. Cl.
G01L 19/12 (2006.01)
G01L 7/16 (2006.01)
F17C 13/02 (2006.01)

(52) U.S. Cl. .................. 116/272; 116/DIG. 7

(58) Field of Classification Search .......... 116/272, 116/34 R, 34 A, 70, 264, 266, DIG. 7; 73/146.8
See application file for complete search history.

(56) References Cited

U.S. PATENT DOCUMENTS

| 3,594,745 | A | * | 7/1971 | Nickels | 340/502 |
| 3,800,736 | A | | 4/1974 | Krohn | 116/268 |
| 3,827,393 | A | | 8/1974 | Winther | 116/34 R |
| 3,910,223 | A | | 10/1975 | Krohn | 116/70 |
| 4,082,056 | A | | 4/1978 | German | 116/34 R |
| 4,512,278 | A | | 4/1985 | Winther | 116/34 R |
| 4,531,473 | A | | 7/1985 | Winther | 116/34 R |
| 4,590,794 | A | | 5/1986 | Liebl | 116/34 R |
| 4,745,876 | A | | 5/1988 | Whiting | 116/268 |
| 5,325,808 | A | | 7/1994 | Bernoudy, Jr. | 116/34 R |
| 7,493,808 | B2 | | 2/2009 | Milanovich et al. | 73/146.8 |

FOREIGN PATENT DOCUMENTS

| JP | 06-302254 A | 5/1995 |
| JP | 2009-058129 A | 3/2009 |

* cited by examiner

Primary Examiner — R. A. Smith
(74) Attorney, Agent, or Firm — Kenyon & Kenyon LLP

(57) ABSTRACT

An indicator includes a case mountable in a gas filling passage of a pressure container; a valve element which is urged toward one side of the case connectable to the pressure container, the valve element being movable in the case to a position balanced with gas pressure in the pressure container; a seal member for ensuring gas tightness between the valve element and the case; and an indicating member slidable relative to the case between a position protruding outside the case and a position not protruding. The spring force and a gas pressure force may be equally balanced at first and second balanced positions of the valve element.

4 Claims, 11 Drawing Sheets

INDICATOR FOR PRESSURE CONTAINER

CROSS REFERENCE TO RELATED APPLICATIONS

This application is a continuation-in-part of U.S. application Ser. No. 11/896,233 (filed Aug. 30, 2007), the entirety of which is hereby incorporated by reference.

BACKGROUND

1. Field of the Invention

The present invention relates to an indicator for pressure container, attached to a nitrogen gas cylinder for retaining a work in a press working machine by pressing the work against a fixed die, and arranged to give a warning when gas pressure in the work retaining nitrogen gas cylinder decreases below a predetermined value.

2. Description of Related Art

In a press working machine, when press working is to be performed, a work to be worked on is fixed with a nitrogen gas cylinder for retaining the work by downward movement of a movable die. More specifically, a high-pressure nitrogen gas of about 10 MPa is filled into the cylinder and the high pressure gas exerts a constant force on a rod through a piston. For instance, if the cylinder is 120 mm in diameter, a pressure of 10 MPa can apply a force of about 4.4 ton. This nitrogen gas cylinder is placed in a work contact portion of the movable die and configured to bring the rod into contact with the work retainer when the die is moved downward. Accordingly, the work retainer can hold the work with a predetermined force to fix the position of the work. It is therefore possible to enhance the punching accuracy without permitting displacement of the work during a shearing process using a press.

When the movable die is held in direct contact with the work retainer, the pressing force of the movable die directly acts on the work, which may cause deformation of the work. To avoid such disadvantage, the work retainer and the nitrogen gas cylinder are interposed therebetween.

In use, the nitrogen gas cylinder is filled with a high pressure nitrogen gas of about 10 MPa. After repeated use, however, the pressure of the filled nitrogen gas will decrease. When the nitrogen gas pressure decreases below 7 MPa, for example, the pressing force of the work retainer lowers, which is problematic.

To solve the above problem, the nitrogen gas cylinder is conventionally provided with an indicator for pressure container in order to give a warning when the pressure of nitrogen gas in the cylinder decreases to a predetermined value or lower.

When the pressure container indicator is brought in a warning state, an operator has to interrupt a press working operation and refill high pressure nitrogen gas into the nitrogen gas cylinder.

An example of the pressure container indicator is shown in FIG. 19. A hollow case 111 has a cavity 111a opening at a left end, in which a piston rod 112 is slidably fitted. An O-ring 113 serving as a seal member is mounted on the periphery of the piston rod 112. The piston rod 112 is urged leftward by a spring 114. The piston rod 112 also receives, at its left end face, the internal pressure of the nitrogen gas cylinder. A right end of the piston rod 112 forms an indicating portion 112a which can protrude outside the case 111.

When the gas pressure in the nitrogen gas cylinder is a predetermined value or higher, the piston rod 112 is moved rightward against the spring 114 to make the indicating portion 112a protrude outside the case 111. When the gas pressure in the nitrogen gas cylinder becomes lower than the pressure value, on the other hand, the force of the spring 114 exceeds the force of the gas pressure. Accordingly, the piston rod 112 is moved rightward to retract the indicating portion 112a into the case 111.

Retracting of the indicating portion 112a makes the operator who operates the press working machine recognize that the gas pressure in the nitrogen gas cylinder is abnormal.

However, the conventional abnormality indicator has the following disadvantages. The piston rod 112 moves in proportion to the gas pressure in the nitrogen cylinder. When the gas pressure is around the predetermined value, the position of the indicating portion 112a is unclear, which makes it difficult to determine whether the gas pressure is normal or abnormal. Further, the indicating portion 112 is retracted under abnormal condition. This is hard to visually recognize.

A technique for solving the above problems has been proposed. For example, FIG. 20 shows an indicator for pressure container disclosed in Japanese patent No. 2843491. A protrusion 105 is provided on an end face of bellows 104 communicating with the gas of a pressure container. Under normal condition, the protrusion 105 is engaged with a rotating lever 106 which is engaged with a stopper 103. The stopper 103 serves to stop an indicating rod 101 within the case under normal condition. The indicating rod 101 is urged by a spring 102 in a direction to protrude from the case.

When the gas decreases to the predetermined value or lower, the position of the bellows 104 containing gas moves to the left, causing a positional change of the protrusion 105 of the bellows 104. The rotating lever 106 is thus rotated, disengaging the stopper 103 from the indicating rod 101. The indicating rod 101 is then allowed to protrude outside the case by the urging force of the spring 102.

Specifically, there is disclosed an indicator with the indicating rod 101 which can be disengaged and protruded by the spring 102.

Here, the bellows, which changes its position while internally containing gas, is unlikely to cause gas leakage even without using any special sealing mechanism, and thus is convenient.

SUMMARY

However, the invention disclosed in FIG. 20 has the following disadvantages.

That is, the necessity of the bellows containing gas causes a problem with extra space. The pressure container also has to be provided with, besides the passage for filling/discharging gas, an additional passage for allowing the gas pressure to act on the bellows.

The work retaining nitrogen gas cylinder of the press working machine needs to be attached to the movable die of a press die. However, the pressure container indicator using the bellows could not sufficiently provide such space.

The present invention has been made in view of the above circumstances and has an object to provide an indicator for pressure container, arranged in a small space to reliably indicate a decrease in gas pressure in a pressure container.

To achieve the purpose of the invention, the indicator for pressure container according to the present invention includes: (a) a case mountable in a gas filling passage of a pressure container; (b) a valve element which is urged toward one side of the case connectable to the pressure container, the valve element being movable in the case to a position balanced with gas pressure in the pressure container; (c) a seal member for ensuring gas tightness between the valve element and the case; and (d) an indicating member slidable relative to the case between a position protruding outside the case and a position not protruding; wherein (e) the seal member is arranged on the valve element so that the seal member is in contact with the case to ensure gas tightness when the valve element is in a first balanced position while a gas pressure in the pressure container is a predetermined value or higher and the seal member is out of contact with the case not to ensure gas tightness when the valve element is in a second balanced position while the gas pressure is less than the predetermined value. Accordingly, when the gas pressure decreases below the predetermined value, gas tightness between the valve element and the case cannot be maintained. As a result, the gas pressure introduced into the case acts on the indicating member, which protrudes outside the case to give a warning. The indicating member is moved at once to the maximum protruding position by gas pressure. Then, even when the gas pressure is interrupted, the indicating member receives no returning force and thus remains in the maximum protruding position. Therefore the operator can easily find the warning.

Further, the indicating member is not urged toward one side of the case to be connected to the pressure container, so that the indicating member that once protruded will not return automatically unless the operator returns it.

In certain embodiments, the spring force and a force of the gas pressure are equally balanced at both the first and second balance positions.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

A detailed description of a preferred embodiment of an indicator for pressure container of the present invention will now be given referring to the accompanying drawings.

Figure 1:
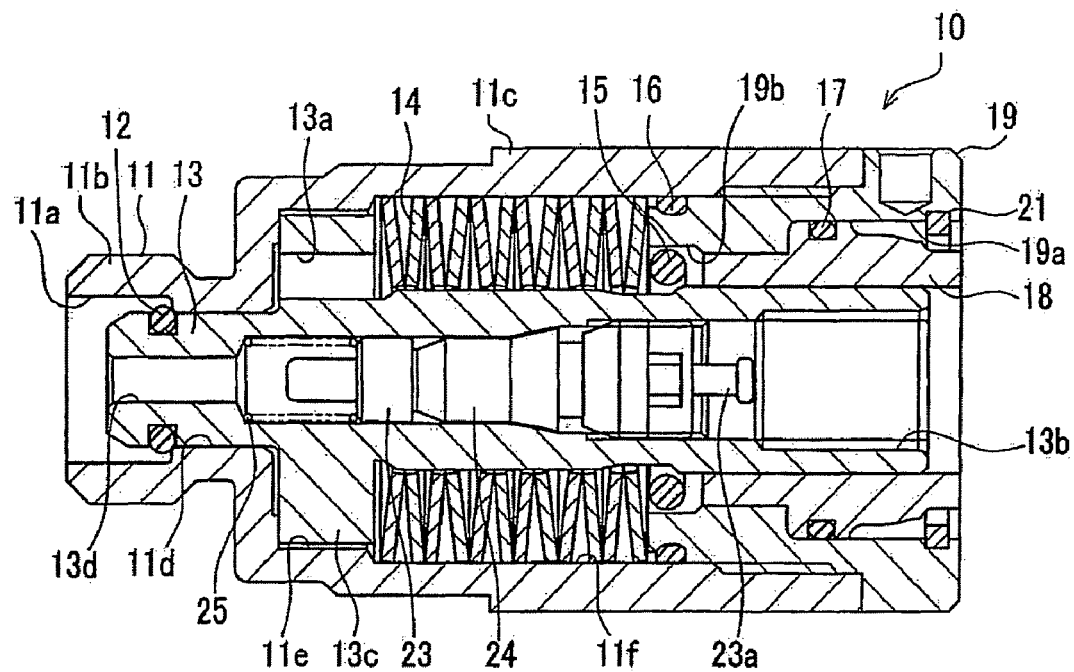
FIG. 1 is a sectional view showing a configuration of an indicator for pressure container of a first embodiment of the present invention.

FIG. 1 is a sectional view showing a configuration of an indicator 10 for pressure container. A hollow cylindrical case 11 having both open ends includes a small-diameter part 11*b* having a small outer diameter and a large-diameter part 11*c* having a large outer diameter. As an inner diameter, a seal part 11*d* having a minimum inner diameter is formed in a transition between the outer diameters of the small-diameter part 11*b* and the large-diameter part 11*c*. A small-diameter inner part 11*a* is formed in the small-diameter part 11*b*. Large-diameter inner parts 11*e* and 11*f* are formed in the large-diameter part 11*c*. The large-diameter inner part 11*e* is slightly smaller in diameter than the large-diameter inner part 11*f*. In the large-diameter inner part 11*e*, a valve element 13 is held slidably in an axial direction thereof.

Specifically, the valve element 13 is of a cylindrical shape formed, around the center, with a large-diameter part 13*c* slidably held in the large-diameter inner part 11*e*. A gas passage 13*d* is also formed through the center of the valve element 13. A check valve is disposed in the gas passage 13*d*. The check valve includes a fixed passage member 24, a slidable valve element 23, and an urging spring 25. The gas passage 13*d* is formed at a right end with an internal thread portion 13*b*. The fixed passage member 24 is internally formed therethrough with a gas passage and provided with a valve seat at a left end. In this gas passage, the valve element 23 is slidably held so that a right end portion 23*a* of the valve element 23 protrudes outside the fixed passage member 24. Further, the slidable valve element 23 is urged into contact with the valve seat of the fixed passage member 24 by the urging spring 25.

In a groove formed on the outer periphery of the valve element 13 near a left end, a rubber O-ring 12 is fitted. A passage 13 is formed through part of the large-diameter part 13*c*. A disc spring 14 consisted of twelve disc springs in stacks is placed in contact with a right end face of the large-diameter part 13*c*. The case 11 has an internal thread portion formed on the inner periphery of a right end opening and a cover 19 is screwed therein. A left end of the cover 19 receives the other end of the disc spring 14.

The cover 19 is formed with a groove on the outer periphery near the left end, in which a rubber O-ring 16 is fitted. Of inner portions of the cover 19, a small inner diameter part 19b is formed around the left end and a large inner diameter part 19a is formed opening toward a right end. In the small inner diameter part 19b near an opening, a rubber O-ring 15 is installed. An indicating member 18 is slidably placed in the large inner diameter part 19a. More specifically, an O-ring 17 is interposed between the outer periphery of the indicating member 18 and the large inner diameter part 19a. The indicating part 18 is slidable within the large inner diameter part 19a through the O-ring 17. A C-shaped stopper ring 21 is fixed near the right end of the large inner diameter part 19a.

Figure 17:
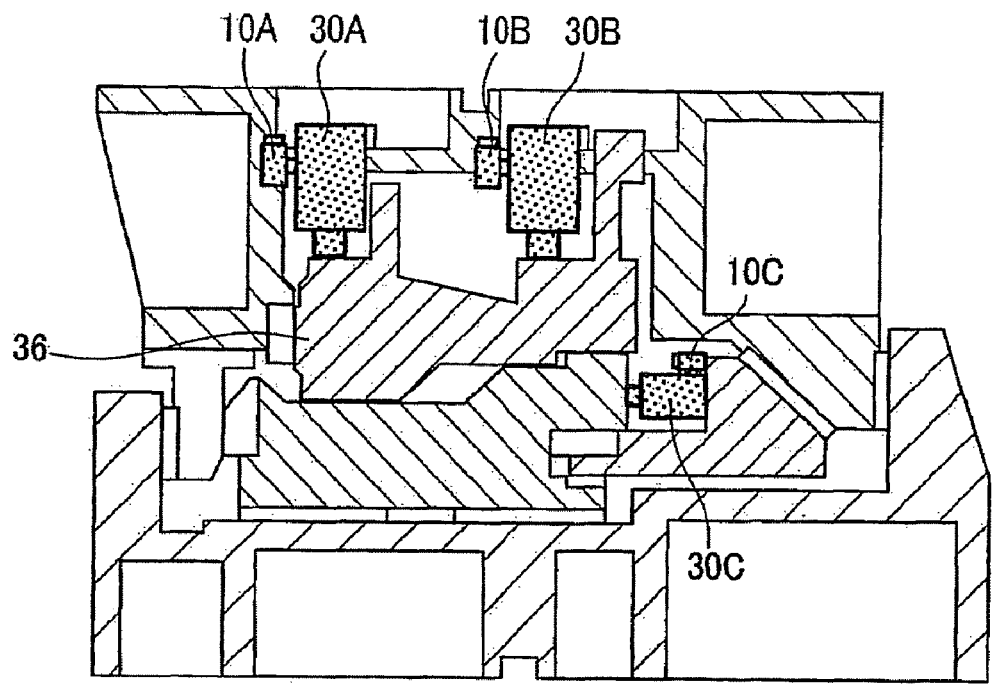
FIG. 17 is a view showing a use state of the pressure container indicator while a nitrogen gas cylinder is mounted on a work retainer of a press working machine.

Next, operations of the pressure container indicator 10 will be described. The small-diameter part 11b of the case 11 of the pressure container indicator 10 is attached to a nitrogen gas cylinder 30 serving to press a work in a press working machine as shown in FIG. 17. The small-diameter inner part 11a is communicated with a high pressure gas storage part of the nitrogen gas cylinder 30.

Figure 2:
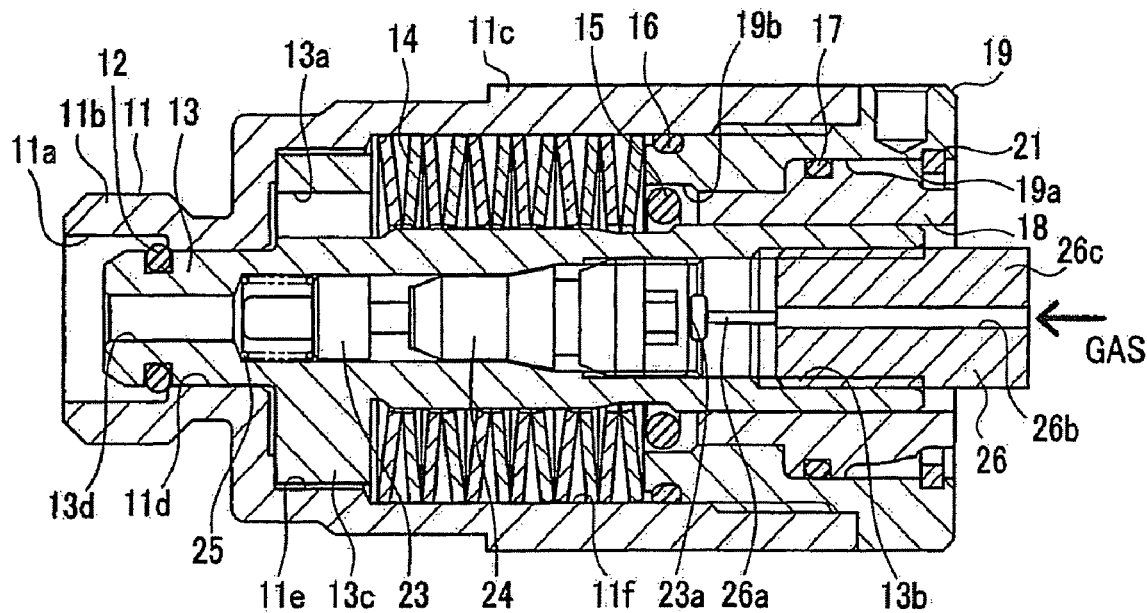
FIG. 2 is a sectional view of the pressure container indicator in a use state during high pressure gas filling.

After the pressure container indicator 10 as shown in FIG. 2 is attached to the nitrogen gas cylinder 30, a gas filling device is attached.

A joint member 26 formed with an external thread portion 26c on the outer periphery is screwed in the internal thread portion 13b. A pin 26a is formed protruding from a left end of the joint member 26. Further, a gas passage 26b is formed through the center of the joint member 26.

FIG. 2 shows a state in which the external thread portion 26c of the joint member 26 is threadedly engaged with the internal thread portion 13b of the valve element 13. In this state, the pin 26a of the joint member 26 abuts against the right end portion 23a of the slidable valve element 23, thus holding the valve element 23 to the left against the force of the urging spring 25.

A high pressure gas source is connected to the gas passage 26b of the joint member 26, and a high pressure gas is supplied thereto to fill a high pressure nitrogen gas of 10 MPa into the nitrogen gas cylinder 30. Of course, other pressures and other gases may be used.

Figure 3:
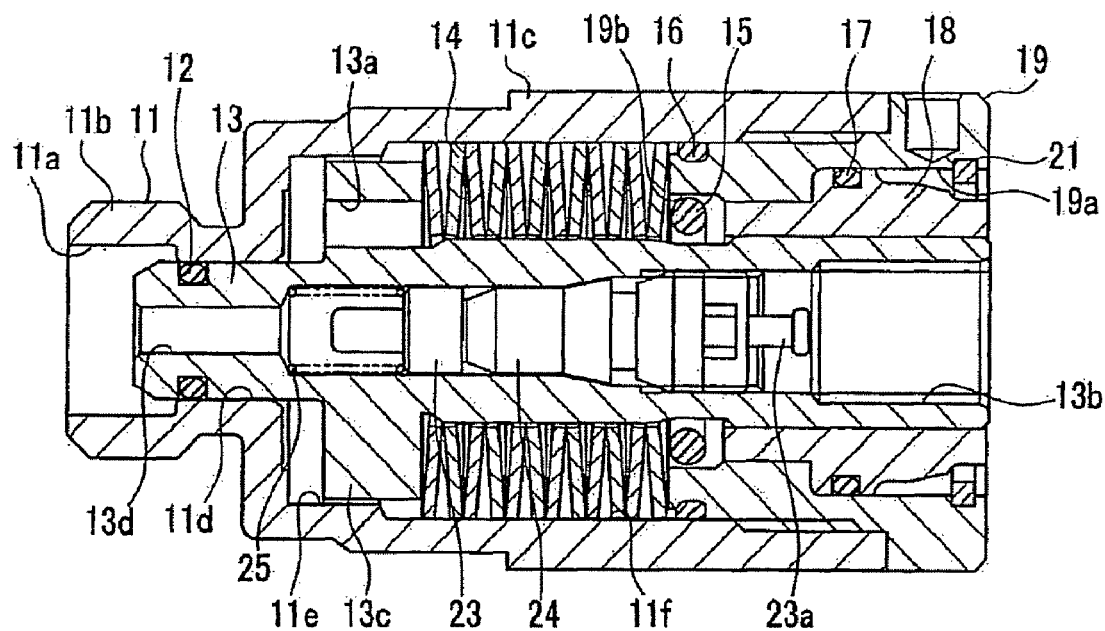
FIG. 3 is a sectional view of the pressure container indicator in a use state for 7 MPa or higher.

After the nitrogen gas cylinder 30 is filled with the high pressure nitrogen gas of 10 MPa, the gas filling device such as the joint member 26 is detached. This state is shown in FIG. 3. The valve element 13 is moved slightly to the right by the force of the disc spring 14 as compared with the view in FIG. 2.

In the gas filled state in FIG. 3, the spring force of the disc spring 14 and the pressing force of the filled high pressure nitrogen gas (a pressure of 10 MPa or higher) pressing the valve element 13 are equally balanced, so that the O-ring 12 of the valve element 13 is held in a position in contact with the seal part 11d to act as a seal. This point of equal balance at which O-ring 12 is held in contact with seal part 11d may be referred to as a first balanced position.

Figure 4:
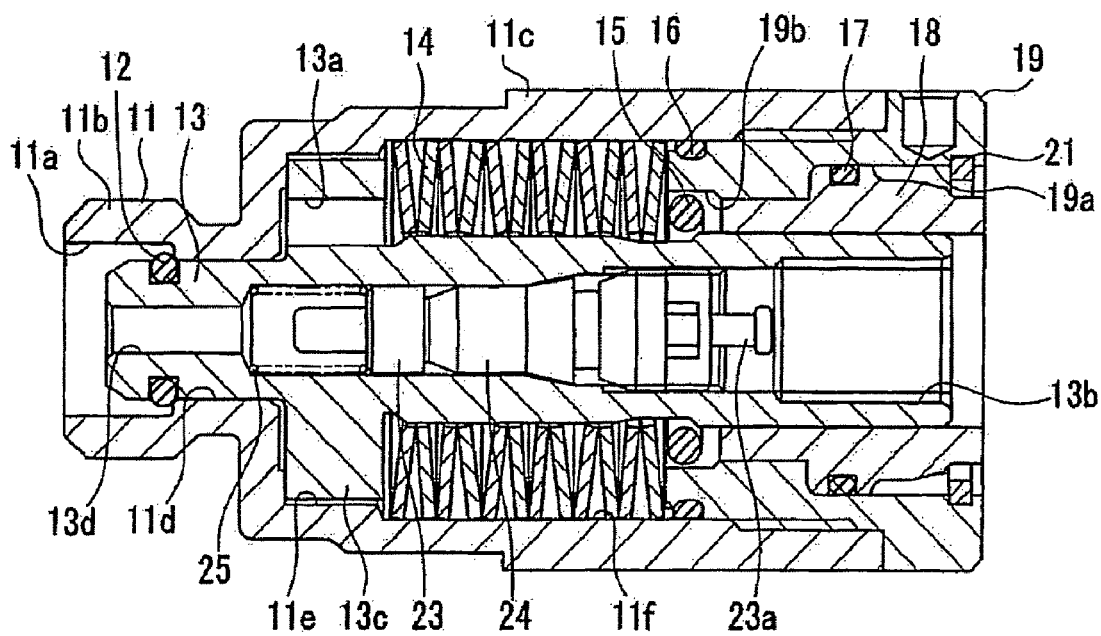
FIG. 4 is a sectional view of the pressure container indicator in a first use state for less than 7 MPa.

FIG. 4 shows a state in which the pressure of nitrogen gas in the nitrogen gas cylinder 30 decreases below 7 MPa. The nitrogen gas cylinder 30 is continuously used once nitrogen gas is filled. Thus, a pressure decrease occurs after a certain period of use. When the pressure in the small-diameter inner part 11a communicating with the nitrogen gas cylinder 30 decreases below 7 MPa, the O-ring 12 attached to the valve element 13 is disengaged from the seal part 11d. This point, shown in FIG. 4 for example, may be referred to as the second balanced position.

Figure 21:
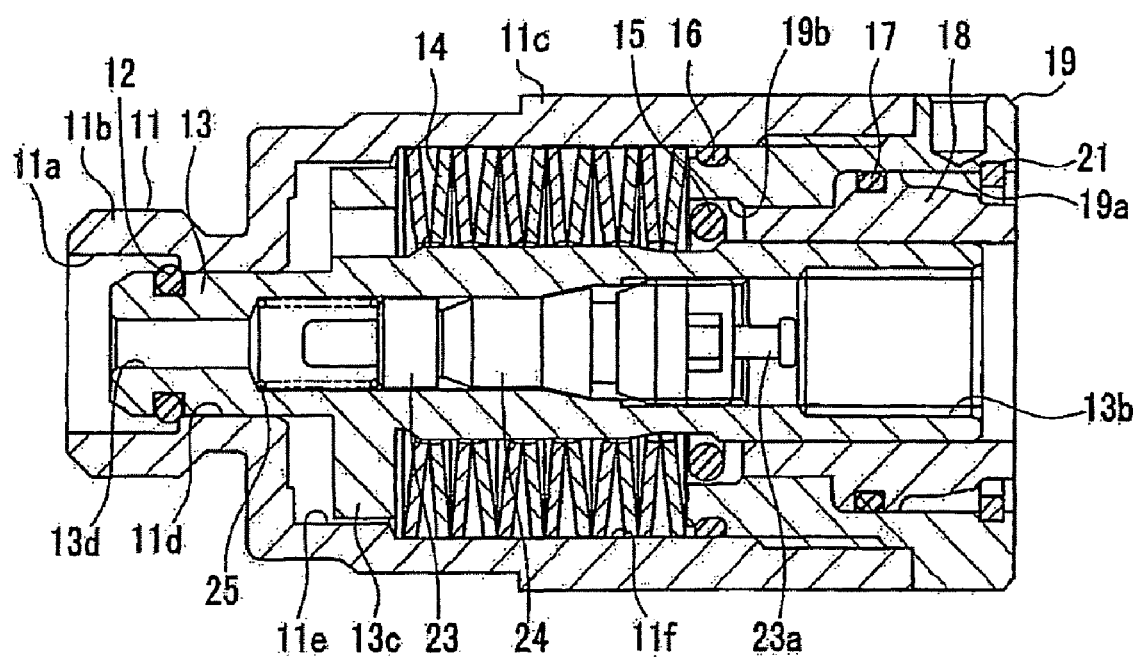
FIG. 21 is a sectional view of the pressure container indicator in one example of a second balanced position.

In certain embodiments, when an indicator is in the second balanced position, the spring force may be in balance with the force caused by the gas pressure, such that valve element 13 is held in place by the equal and opposing forces. As the pressure in the gas container decreases, so does the pressure force exerted on the valve element. As a result, the spring force exerted by the spring (now greater than the pressure force acting on the opposing side of the valve element) will push the valve element away from the spring. Simultaneously, the spring stretches closer to its equilibrium position. As this occurs, the spring force will decrease in accordance with Hooke's Law. If left unobstructed, the spring will continue to stretch, pushing the valve element as it does so, until the spring force decreases to the point where it equals the pressure force. At this point (the second balanced position), the spring force and the pressure force are again equally balanced, albeit at a different value than that of the first balanced position. In other words, rather than any structure (such as the wall between seal part 11d and shoulder 11e of case 11) preventing valve element 13 from moving further to the left, a balance of forces between the spring and gas pressure keeps the valve element in position. An example of this configuration is shown in FIG. 21, which depicts valve member 13 in the second balancing position where no part of case 11 inhibits the leftward movement of valve element 13. Of course, this is but one example configuration for the second balanced position, and other configurations (in which a wall of the case does obstruct movement of the valve member for example) are certainly possible.

Figure 5:
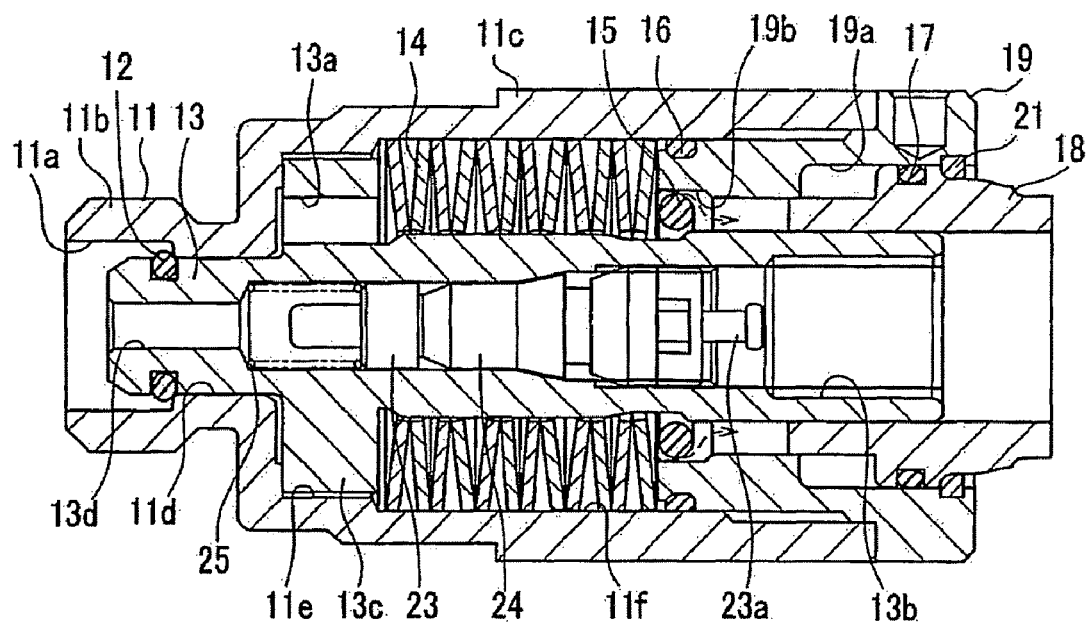
FIG. 5 is a sectional view of the pressure container indicator in a second use state for less than 7 MPa.

Accordingly, the high pressure gas of 7 MPa is allowed to pass through the passage 13a of the valve element 13 to act on the indicating member 18. This indicating member 18 is caused to protrude from the right end face of the cover 19 as shown in FIG. 5. At that time, the indicating member 18 comes into contact with the C-shaped stopper ring 21 and hence cannot further move outward. By the indicating member 18 protruding from the right end face of the cover 19, the operator can find that the pressure of nitrogen gas in the nitrogen gas cylinder 30 has decreased below 7 MPa and refilling of nitrogen gas is needed. (While an example predetermined pressure of 7 MPa is discussed herein, it will be understood that the present invention can be modified so as to allow the indicating member to protrude from the cover at other pressures, such as 5 MPa or 8 MPa for example.)

Figure 6:
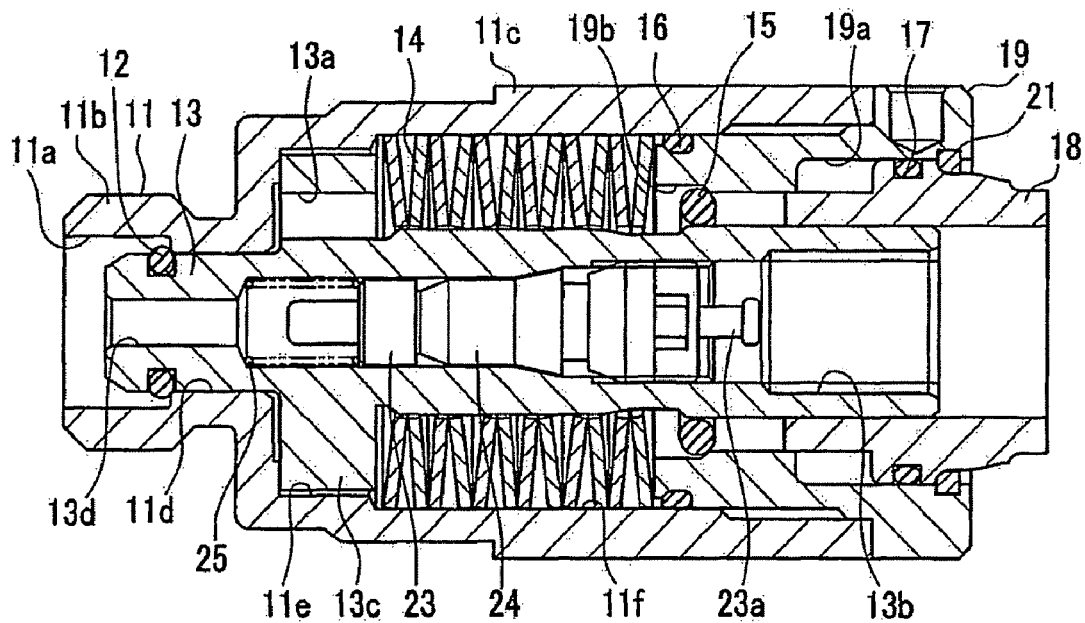
FIG. 6 is a sectional view of the pressure container indicator in a third use state for less than 7 MPa.
Figure 7:
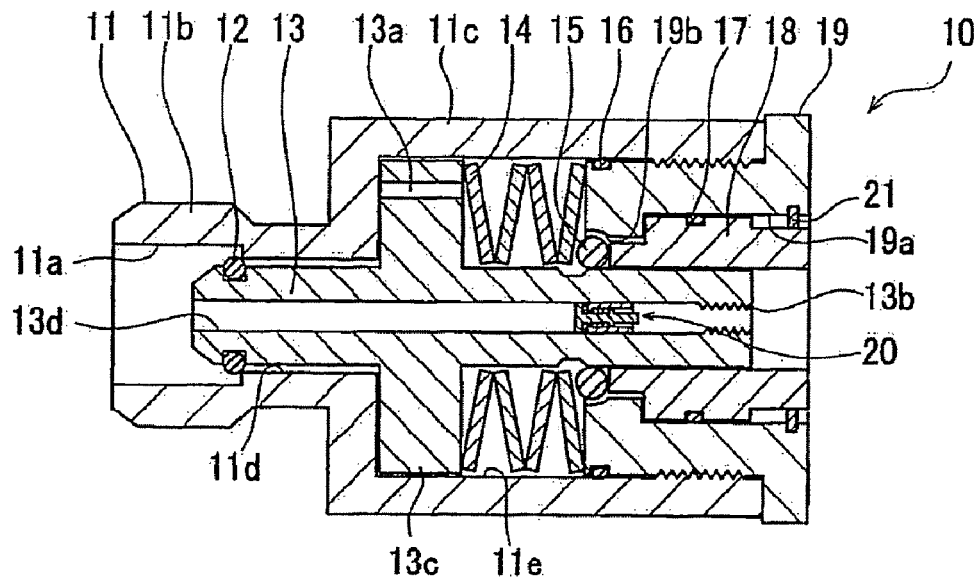
FIG. 7 is a sectional view showing a configuration of an indicator for pressure container in a second embodiment of the present invention.

Successively, as shown in FIG. 6, the high pressure nitrogen gas presses the O-ring 15 into the small inner diameter part 19b. The O-ring 15 pushed into the small inner diameter part 19b performs the sealing function of preventing the high pressure nitrogen gas from further flowing to the outside. Protruding the indicating member 18 and pushing the O-ring 15 into the small inner diameter part 19b are consecutively carried out. Accordingly, the amount of nitrogen gas which actually flows to the outside is so small as to cause little change in the gas pressure in the nitrogen gas cylinder 30.

As described above in detail, the pressure container indicator 10 of the present embodiment includes the case 11 to be mounted in the gas filling passage of the pressure container, the valve element 13 which is urged toward one side of the case 11 connectable to the pressure container and is movable within the case to a position balanced with the gas pressure in the pressure container, the O-ring 12 which is a seal member for ensuring gas tightness between the valve element 13 and the case 11, and the indicating member 18 slidable relative to the case 11 between a protruding position outside the case and a non-protruding position. The O-ring 12 is arranged on the valve element 13 so that the O-ring 12 is in contact with the case 11 to ensure gas tightness when the valve element 13 is in a first balanced position while the gas pressure in the pressure container is 7 MPa or higher and the O-ring 12 is out of contact with the case 11 not to provide gas tightness when the valve element 13 is in a second balanced position while the gas pressure is less than 7 MPa. When the gas pressure decreases below 7 MPa, therefore, the gas tightness is not ensured, allowing the gas pressure introduced in the case 11 to act on the indicating member 18. The indicating member 18 is then protruded from the case 11 to give a warning. The indicating member 18 is moved at once to the maximum protruding position by the gas pressure. Even when the gas pressure is then interrupted, the indicating member 18 receiving no returning force remains at the maximum protruding position. The operator can therefore easily find the warning.

Further, the indicating member 18 is not urged toward the side of the case 11 connected to the pressure container, and thus the indicating member 18 after once protruded cannot automatically return unless the operator returns it.

The pressure container indicator 10 of the present embodiment can reliably prevent the outflow of gas from the pressure container indicator 10. Specifically, when the gas flows to cause the indicating member 18 to protrude, the O-ring 15 serving as a second seal member is pushed by the gas flow into a narrow passage leading to the indicating member 18. Thus, the O-ring 15 blocks the narrow passage to prevent the gas from further flowing out.

In the pressure container indicator 10 of the present embodiment, the valve element 13 is internally formed with the passage 13*d* providing communication between the indicator and the pressure container and the check valve 23, 24, 25 is placed in the passage 13*d* to permit a gas flow toward the pressure container. In this manner, a gas filling passage can be provided through the use of the pressure container indicator 10 and it therefore can be entirely made more compact. More specifically, the passage for filling high pressure gas into the nitrogen gas cylinder 30 is provided in the pressure container indicator 10, so that the nitrogen gas cylinder 30 needs no additional passage for high pressure gas filling, resulting in an entire compact configuration.

A second embodiment is shown in FIGS. 7 through 12. A structure of the second embodiment is similar to that of the first embodiment. Accordingly, similar components are assigned the same reference numerals and their detailed explanations are not repeated. Different points will be described below.

Figure 16:
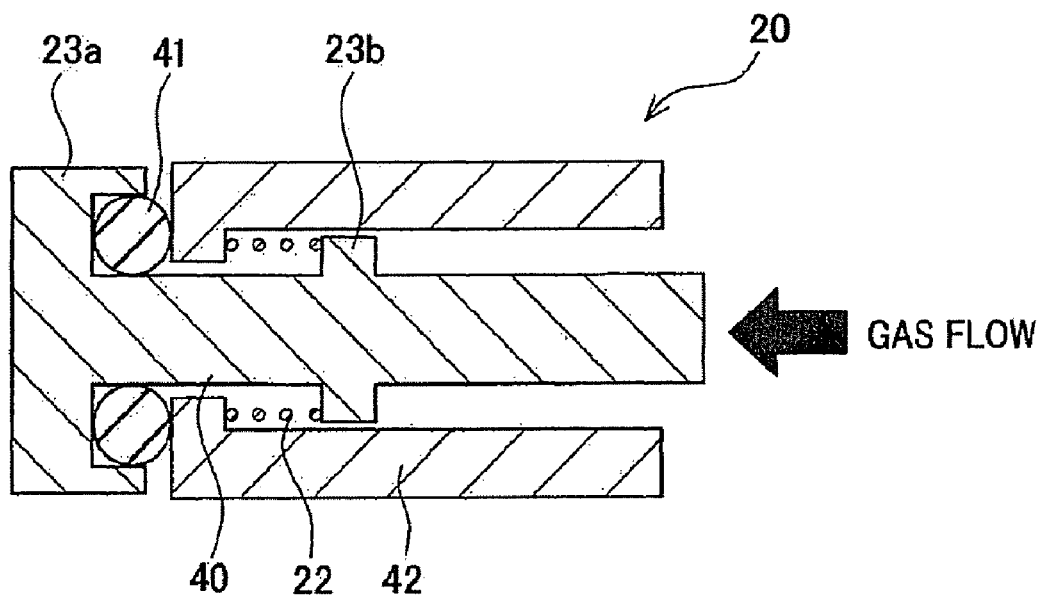
FIG. 16 is a sectional view showing a configuration of a check valve.

The differences are the shape of the gas passage 13*d* of the valve element 13 and the structure of the check valve. FIG. 16 shows the structure of a check valve 20 of the second embodiment. A rod pin 40 is housed slidably in a check valve case 42 having a hollow cylindrical shape. The rod pin 40 has a spring abutment 23*b* on which one end of a compression spring 22 is supported. The rod pin 40 is urged rightward in the figure by the compression spring 22. The rod pin 40 is formed at its left end with a large-diameter part 23*a*. In a back surface (a right side) of the large-diameter part 23*a*, a rubber O-ring 41 is attached. The case 42 is press-fitted in the gas passage 13*d* of the valve element 13. The large-diameter part 23*a* has an outer diameter smaller than the outer diameter of the case 42, forming a flow passage between the gas passage 13*d* and the large-diameter part 23*a*.

When the pressure of gas flowing from right to left as indicated by an arrow in the figure is larger than the force of the spring 22, the rod pin 40 is moved leftward to separate the O-ring from the check valve case 42. In the check valve 20, accordingly, the gas is allowed to flow from right to left as indicated by the arrow in the figure. On the other hand, when the gas pressure exerted on the left end face of the large-diameter part 23*a*, the O-ring 41 is always in contact with the case 42, continuously interrupting the flow from left to right in the figure.

In the second embodiment, the disc spring 14 is constituted of four disc springs.

Figure 8:
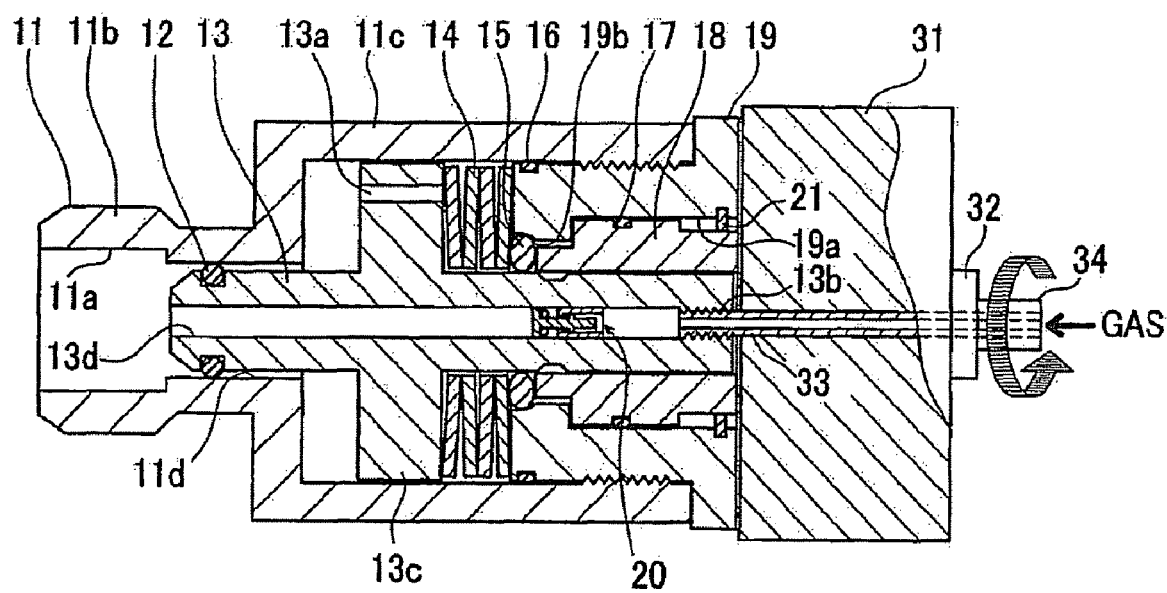
FIG. 8 is a sectional view of the pressure container indicator of the second embodiment in a use state during high pressure gas filling.
Figure 9:
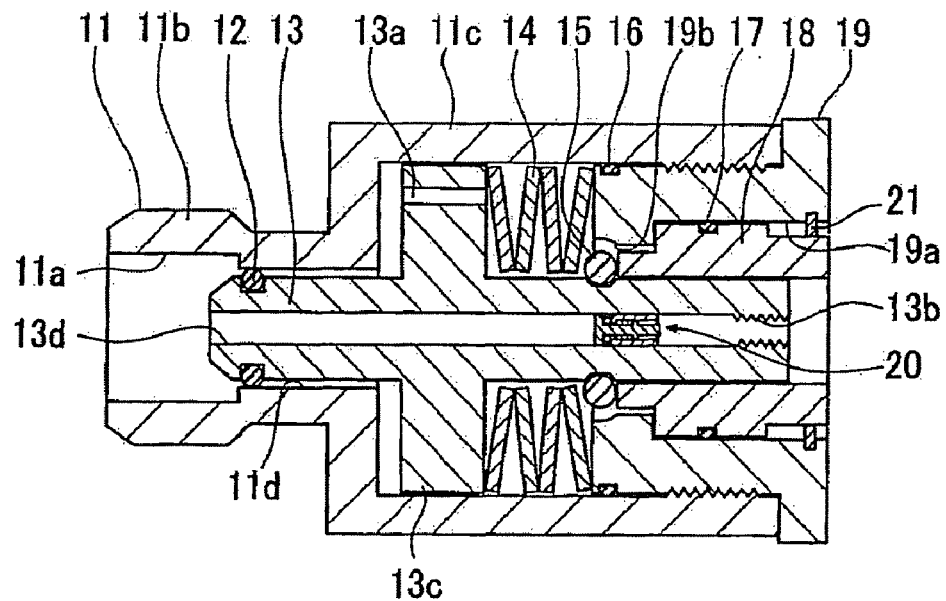
FIG. 9 is a sectional view of the pressure container indicator of the second embodiment in a use state for 7 MPa or higher.
Figure 10:
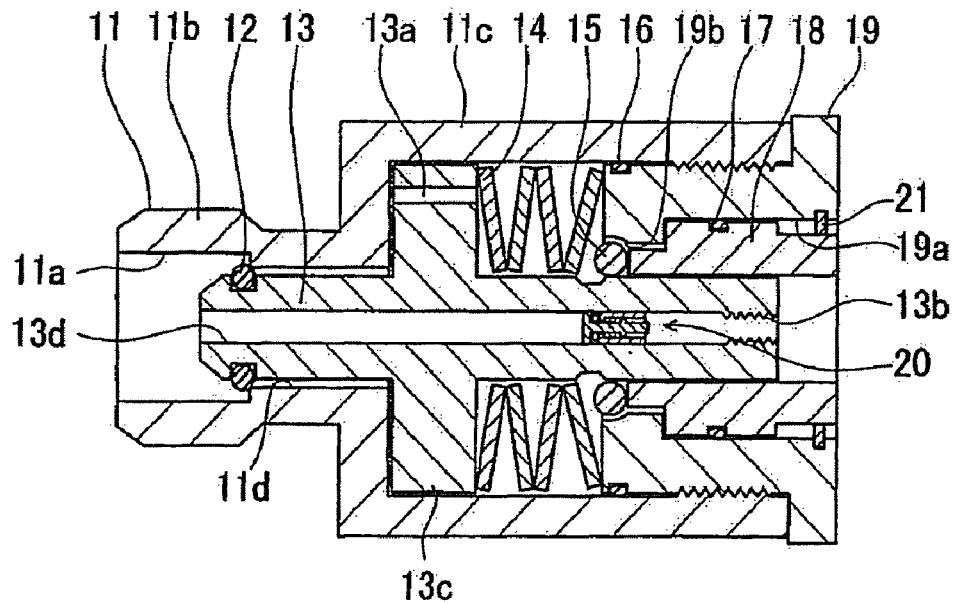
FIG. 10 is a sectional view of the pressure container indicator of the second embodiment in a first use state for less than 7 MPa.
Figure 11:
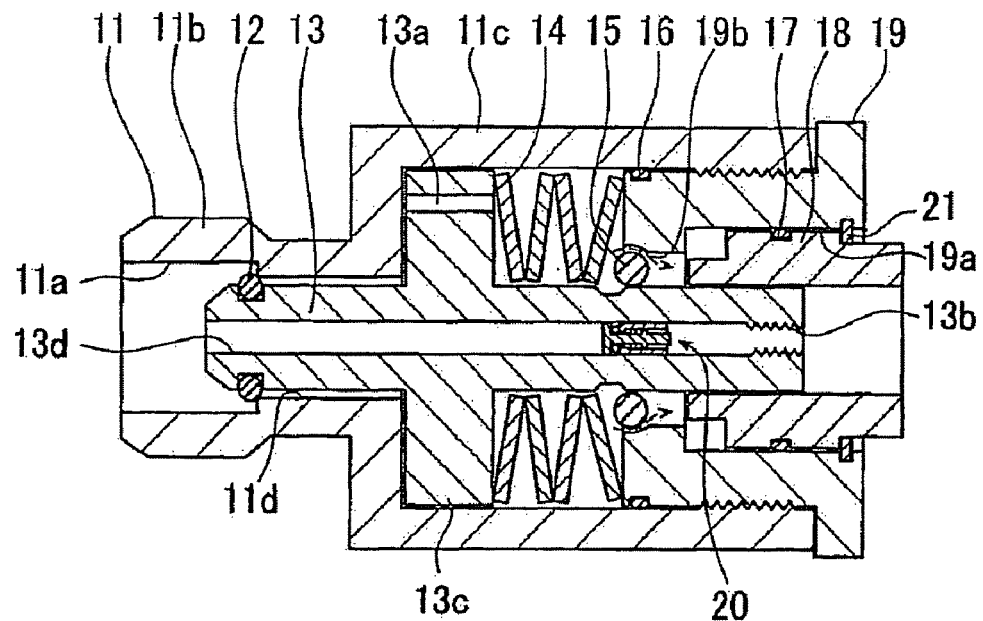
FIG. 11 is a sectional view of the pressure container indicator of the second embodiment in a second use state for less than 7 MPa.
Figure 12:
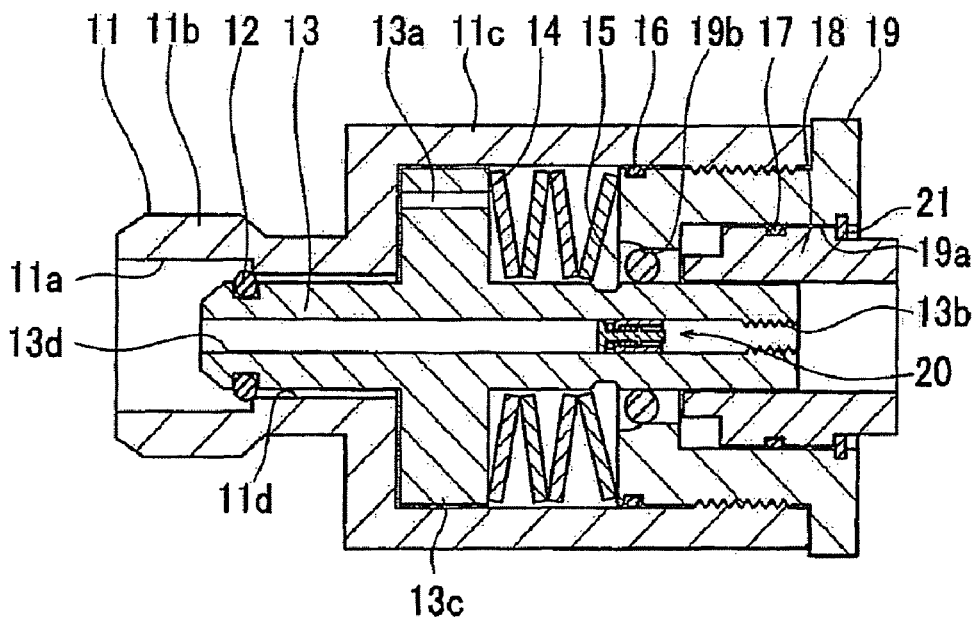
FIG. 12 is a sectional view of the pressure container indicator of the second embodiment in a third use state for less than 7 MPa.

Operations of the second embodiment will be described below, which is different in a gas filling manner from the first embodiment. FIG. 8 corresponds to FIG. 2; FIG. 9 corresponds to FIG. 3; FIG. 10 corresponds to FIG. 4; FIG. 11 corresponds to FIG. 5; and FIG. 12 corresponds to FIG. 6.

A joint jig 31 has a hollow screw 33 protruding leftward. An external thread portion formed on the outer periphery of a distal end of the hollow screw 33 is threadedly engaged with the internal thread portion 13*b* of the valve element 13 as shown in FIG. 8. A manual knob 32 is formed with internal threads and assembled with the hollow screw 33. When the knob 32 is rotated clockwise, causing the screw 33 to move rightward along with the valve element 13. The valve element 13 is moved to the position shown in FIG. 8 against the force of the disc spring 14. The O-ring 12 of the valve element 13 is moved into the seal part 11*d* and brought in contact with its wall to perform a seating function.

Next, a gas joint 34 connected to the manual knob 32 is communicated with a high pressure gas supply source. High pressure nitrogen gas is allowed to flow in. The check valve 20 is arranged to allow gas to flow in when large gas pressure is exerted from right as explained with reference to FIG. 16. Accordingly, the gas is allowed to pass through the gas passage 13*d* of the valve element 13 into the nitrogen gas cylinder. As above, a gas pressure of 10 MPa is filled into the nitrogen gas cylinder 30.

The operations shown in FIGS. 9 through 12 are the same as those in the first embodiment and their explanations are omitted.

A third embodiment of the present invention will be described below. The third embodiment is basically similar to the first embodiment and will be explained with a focus on differences. The explanations of the same parts are omitted.

Figure 13:
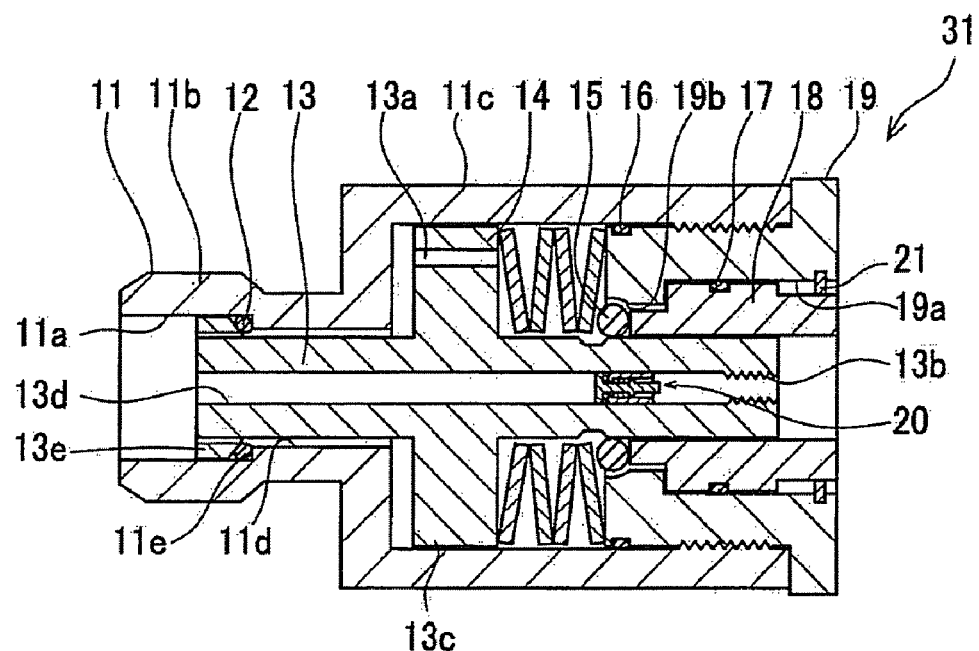
FIG. 13 is a sectional view showing a configuration of an indicator for pressure container of a third embodiment of the present invention.

FIG. 13 is a sectional view showing a configuration of an indicator 31 for pressure container of the third embodiment.

The shape of the left end portion of the valve element 13 and the mounting structure of the O-ring are different from those in the first embodiment. More specifically, the valve element 13 is formed at a left end with a large-diameter part 13*e*. This large-diameter part 13*e* is secured to the valve element with a screw portion. O-ring 12 is held between a right end face of the large-diameter part 13*e* and a shoulder 11*e* of the case 11. When the gas pressure in the nitrogen gas cylinder 30 is 7 MPa or higher, the O-ring 12 is pressed against the shoulder 11*e* of the case 11 to perform a sealing function.

When the gas pressure in the nitrogen gas cylinder 30 decreases below 7 MPa, the force pressing the O-ring 12 against the shoulder 11*e* lowers, weakening the sealing force to allow the passage of gas.

Subsequent operations are the same as those in the first embodiment and are omitted.

A fourth embodiment of the present invention will be described below. The fourth embodiment is basically similar to the first embodiment and will be explained with a focus on differences. The explanations of the same parts are omitted.

Figure 14:
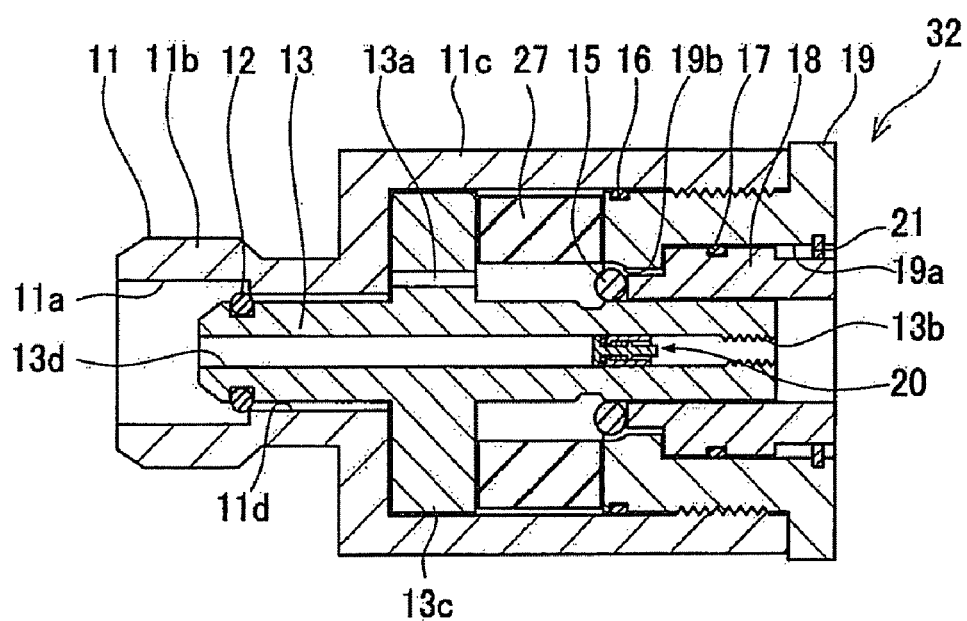
FIG. 14 is a sectional view showing a configuration of an indicator for pressure container of a fourth embodiment of the present invention.

FIG. 14 is a sectional view showing a configuration of an indicator 32 for pressure container of the forth embodiment.

Instead of the disc spring 14, a urethane spring 27 is used. The passage 13*a* of the valve element 13 is formed on the inner side than the urethane spring 27.

According to the fourth embodiment using the urethane spring 27, the pressing force can be equalized among products to reduce product-to-product variations.

A fifth embodiment of the present invention will be described below. The fifth embodiment is basically similar to the first embodiment and will be explained with a focus on differences. The explanations of the same parts are omitted.

Figure 15:
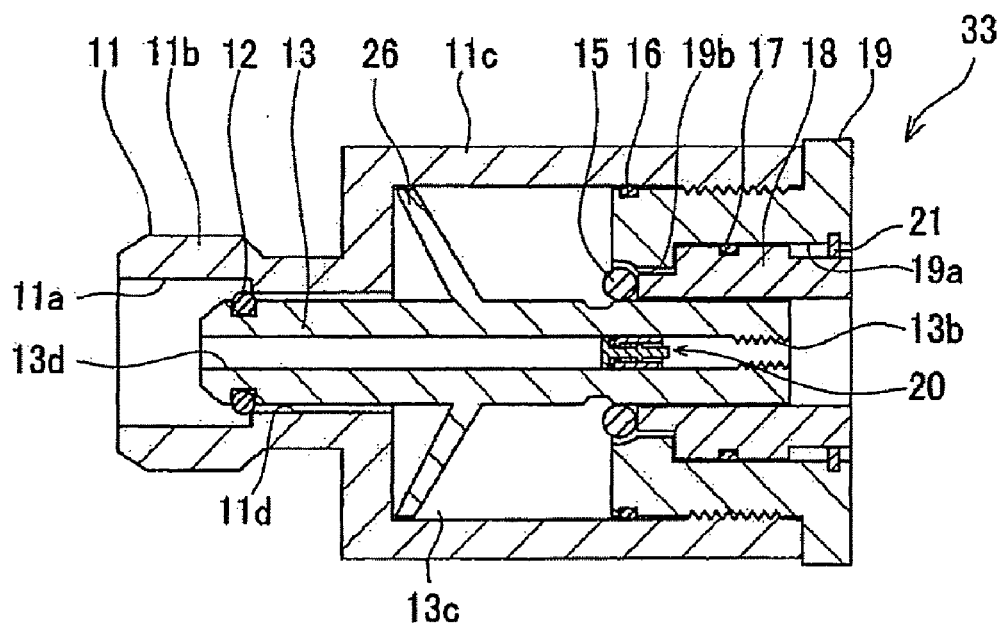
FIG. 15 is a sectional view showing a configuration of an indicator for pressure container of a fifth embodiment of the present invention.

FIG. 15 is a sectional view showing a configuration of an indicator 33 for pressure container of the fifth embodiment.

Instead of the disc spring 14, a spring member 26 is provided integral with the valve element 13. The spring member 26 performs the same function as the disc spring 14.

According to the fifth embodiment having no disc spring 14, assembly efficiency can be improved.

The case where the first embodiment is applied to a press die will be explained below.

In FIG. 17, each of nitrogen gas cylinders 30A, 30B, and 30C is mounted in a place for pressing a work retainer 36. Pressure container indicators 10A, 10B, and 10C are directly attached to the nitrogen gas cylinders 30A, 30B, and 30C individually. Such an attachment manner requires individual checks of the pressure container indicators 10A, 10B, and 10C. This would cause a problem that, even when the indicating member 18 indicates that the pressure is less than 7 MPa, such an indication could not be found soon.

Figure 18:
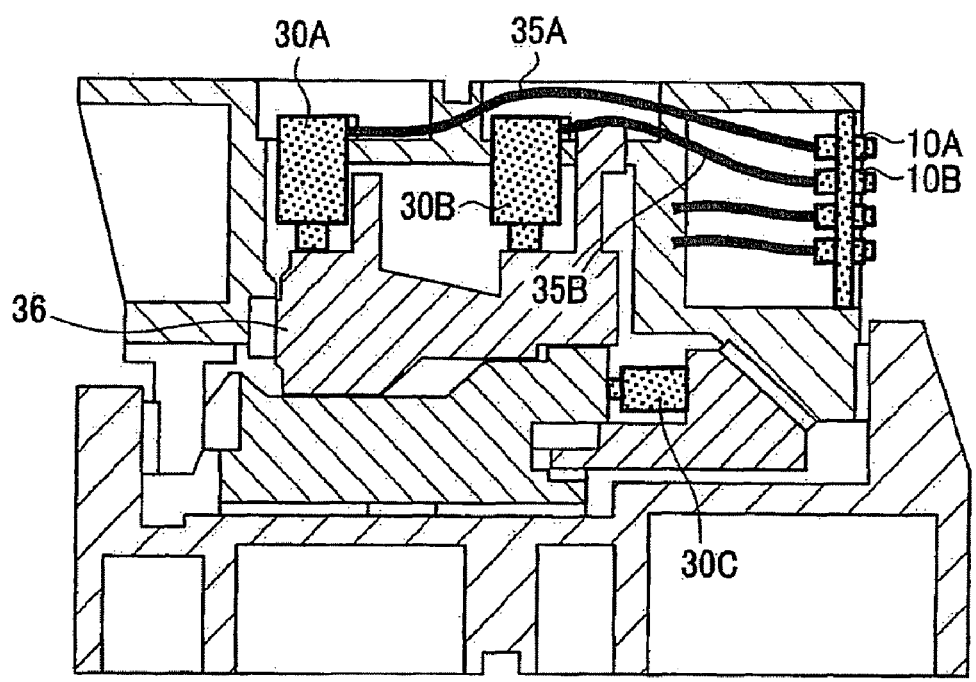
FIG. 18 is a view showing another use state of the pressure container indicator while the nitrogen gas cylinder is mounted on the work retainer of the press working machine.
Figure 19:
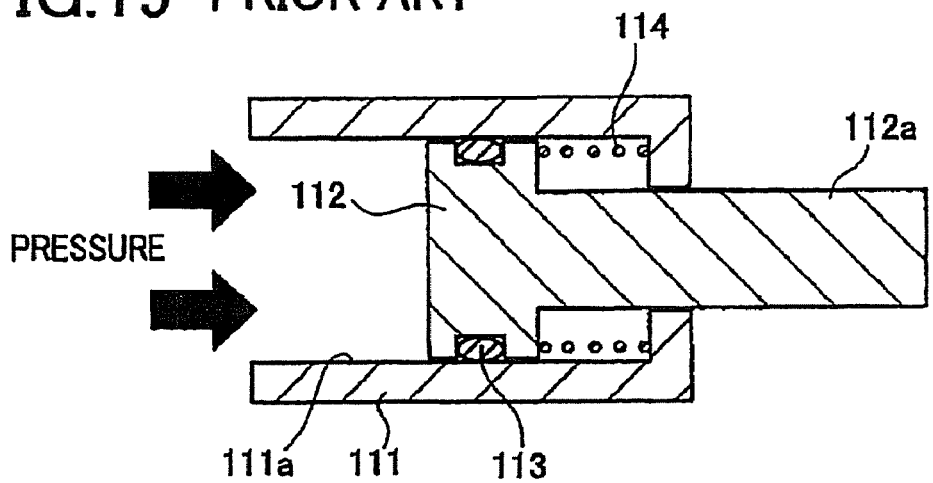
FIG. 19 is a sectional view showing a configuration of an indicator for pressure container in a prior art.
Figure 20:
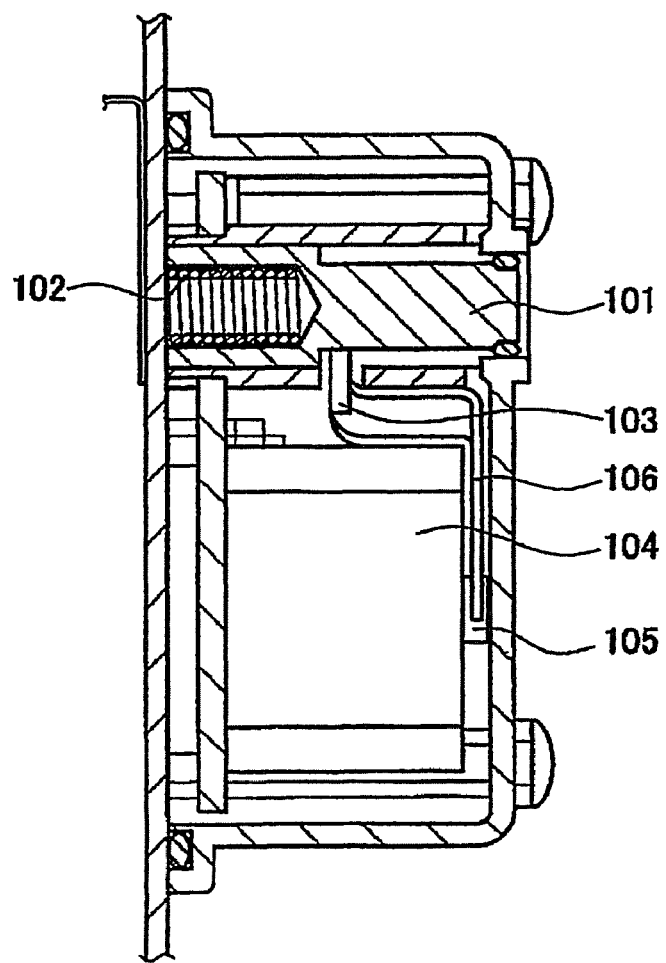
FIG. 20 is a sectional view showing a configuration of another indicator for pressure container in the prior art.

To solve the problem, an indicating manner shown in FIG. 18 uses conduits 35A and 35B, and the pressure container indicators 10A and 10B are placed in positions apart from the nitrogen gas cylinders 30A and 30B and easy to see. Accordingly, the operator can find immediately that each indicating member 18 indicates that the pressure is less than 7 MPa.

The pressure container indicator of the present invention may be embodied in other specific forms other than those explained in the above embodiments.

For instance, in the above embodiments, the reference pressure is explained as 7 MPa. It however may be changed to any pressure value as needed by changing the specification of the spring member.

Although an O-ring having a circular cross-section for example is used as the seal member in the above embodiments, a rubber ring having an elliptic cross-section or a rectangular cross-section may be used.

The examples described herein are merely illustrative, as numerous other embodiments may be implemented without departing from the spirit and scope of the exemplary embodiments of the present invention. Moreover, while certain features of the invention may be shown on only certain embodiments or configurations, these features may be exchanged, added, and removed from and between the various embodiments or configurations while remaining within the scope of the invention. Likewise, methods described and disclosed may also be performed in various sequences, with some or all of the disclosed steps being performed in a different order than described while still remaining within the spirit and scope of the present invention. Further, although various specific pressures have been provided, the present invention is in no way limited to these pressures, which may be varied.

We claim:

1. An indicator for pressure container, comprising:
   a case mountable in a gas filling passage of a pressure container;
   a valve element which is urged by a spring force toward one side of the case connectable to the pressure container, the valve element being movable in the case to a position balanced with gas pressure in the pressure container;
   a seal member for ensuring gas tightness between the valve element and the case; and
   an indicating member slidable relative to the case between a position protruding outside the case and a position not protruding;
   wherein the seal member is arranged on the valve element so that the seal member is in contact with the case to ensure gas tightness when the valve element is in a first balanced position while a gas pressure in the pressure container is a predetermined value or higher and the seal member is out of contact with the case not to ensure gas tightness when the valve element is in a second balanced position while the gas pressure is less than the predetermined value, the spring force and a force of the gas pressure are equally balanced at the first and second balanced positions.

2. The indicator for pressure container according to claim 1 further comprising a second seal member arranged to be movable by a gas flow introduced into the case to interrupt the gas flow toward the indicating member.

3. The indicator for pressure container according to claim 1, wherein
   the valve element is internally formed with a gas passage through which the indicator can be communicated with the pressure container, and
   a check valve configured to permit only the gas flow toward the pressure container is placed in the gas passage.

4. The indicator for pressure container according to claim 2, wherein
   the valve element is internally formed with a gas passage through which the indicator can be communicated with the pressure container, and
   a check valve configured to permit only the gas flow toward the pressure container is placed in the gas passage.

* * * * *